United States Patent [19]

Söderberg et al.

[11] 4,216,615
[45] Aug. 12, 1980

[54] HOTHOUSE

[76] Inventors: Tore S. E. Söderberg, Ågatan 16; Kenneth J. Jonsson, Åkervägen 7, both of S-361 00 Emmaboda, Sweden

[21] Appl. No.: 16,306

[22] Filed: Feb. 28, 1979

[30] Foreign Application Priority Data

Mar. 3, 1978 [SE] Sweden ............................. 7802433

[51] Int. Cl.² .............................................. A01G 9/00
[52] U.S. Cl. ........................................ 47/17; 47/65
[58] Field of Search .................................. 47/17, 65

[56] References Cited

U.S. PATENT DOCUMENTS

| | | | |
|---|---|---|---|
| 1,753,980 | 4/1930 | Baumgartner | 47/17 |
| 2,614,366 | 10/1952 | Fleklin | 47/17 X |
| 3,324,593 | 6/1967 | Strasser | 47/17 X |
| 3,579,907 | 5/1971 | Graves | 47/17 |
| 3,771,258 | 11/1973 | Charney | 47/17 X |
| 3,824,736 | 7/1974 | Davis | 47/17 |
| 4,028,847 | 6/1977 | Davis et al. | 47/65 |

FOREIGN PATENT DOCUMENTS

| | | | |
|---|---|---|---|
| 257250 | 1/1967 | Austria | 47/65 |
| 317630 | 11/1969 | Sweden | |
| 371989 | 12/1974 | Sweden | |

Primary Examiner—Robert E. Bagwill
Attorney, Agent, or Firm—Irvin A. Lavine

[57] ABSTRACT

A hothouse has at least two elongate cultivation corridors beside each other for a series of cultivation wagons which are transversely shiftable along the cultivation corridors in order, during the cultivation cycle, to be progressively moved around in the hothouse. A plant treatment area is provided outside the extent of the cultivation corridors for the starting, care and harvesting of the plants cultivated on the cultivation wagons. Transfer wagons are provided for transfer of the cultivation wagons between the elongate cultivation corridors and also for removal of optional cultivation wagons to the plant treatment area, the transfer wagons having a corridor section for receiving the cultivation wagons during their transfer from one cultivation corridor to the other and during their transfer to and from one cultivation corridor and the plant treatment area. The transfer wagons are reciprocal along transfer corridors which extend transversely of the cultivation corridors. The elongate cultivation corridors may be disposed in hothouse sections lying beside each other and interconnected via transfer areas which may, at the same time, serve as plant treatment areas.

17 Claims, 10 Drawing Figures

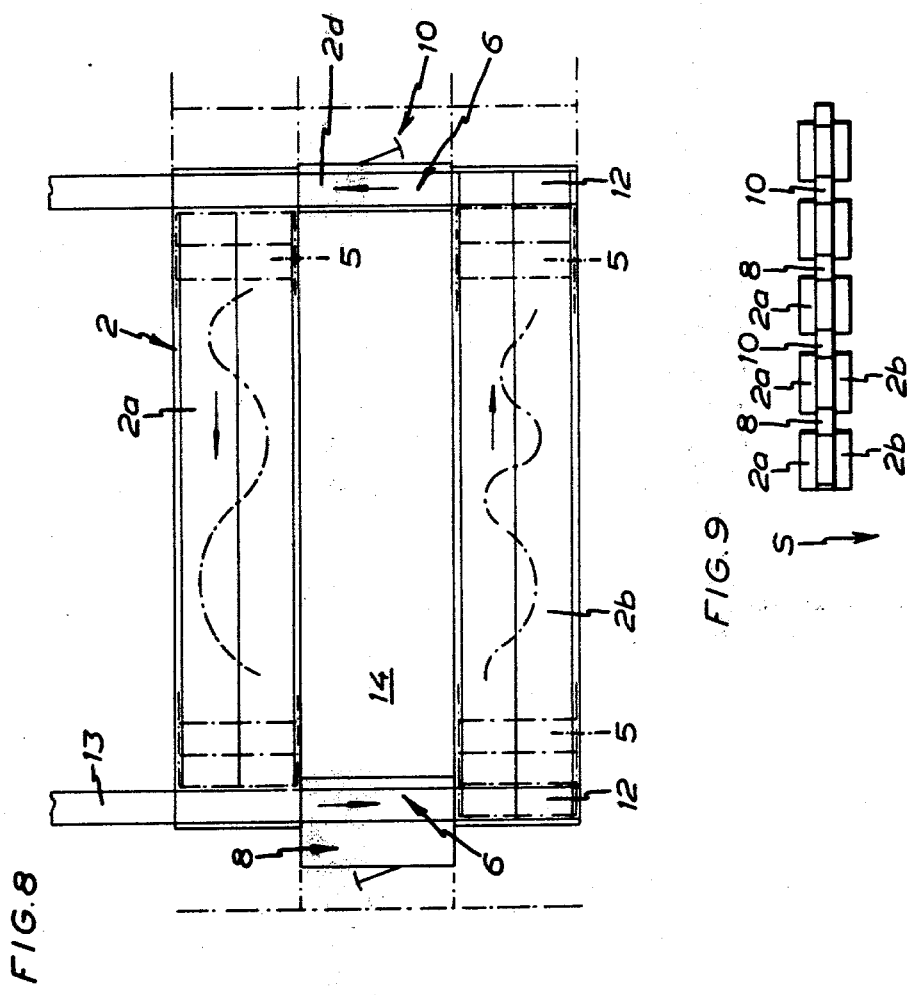

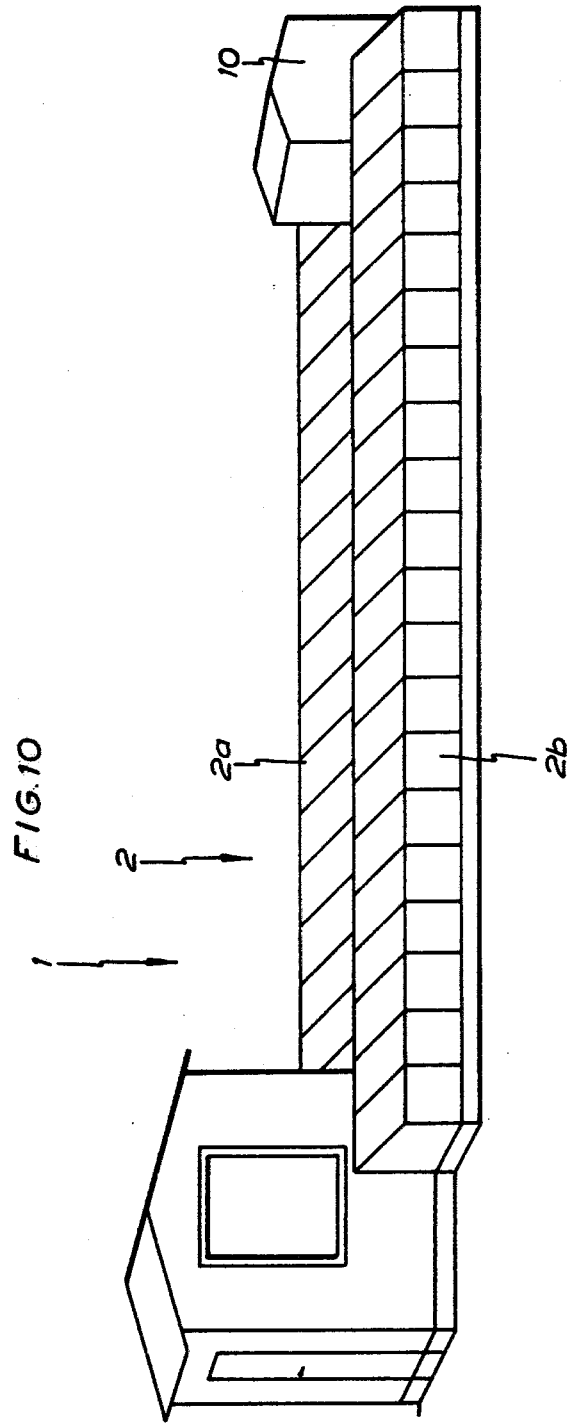

HOTHOUSE

In conjunction with the cultivation of plants in hothouses, it is known in this art to carry out the cultivation in hotbed trays or wagons which are moved along a cultivation corridor in the hothouse. Thus, U.S. Pat. No. 3,824,736 shows a hothouse in which the plants are started at one end of a cultivation corridor, while the cultivation of the plants is effected as these hotbed trays are moved along the cultivation corridor. Harvesting is then carried out at the other end of the corridor, that is to say the cultivated plants are replanted in other pots or are packaged in some other manner for delivery. In connection with the cultivation of, for example, tomatoes and lettuce, there is a need in the art to be able to harvest the tomatoes or thin the lettuce plants during the cultivation period, for which reason a hothouse of the above-disclosed type is not particularly well-suited to this purpose. One major aspect of the present invention is, therefore, to realize a hothouse which is intended primarily for the cultivation of tomatoes or lettuce and in which the cultivation cycle may progress continuously while individual hotbed trays or cultivation wagons are removed in a rational manner from the hothouse.

To this end, the hothouse according to the invention comprises at least two elongate, co-extensive cultivation corridors, the cultivation wagons of the hothouse being disposed in transverse relationship to the elongate cultivation corridors, the ends of the corridors being interconnected by means of a transfer apparatus in the form of a reciprocal transfer wagon which carries a corridor section designed for receiving the cultivation wagons and which is movable into alignment positions with this corridor section in register with each cultivation corridor. Moreover, the hothouse is provided with at least one plant treatment area which is disposed outside the extent of the elongate cultivation corridors, either in association with at least one of the transfer wagons at the ends of the cultivation corridors or in association with a further transfer wagon which carries a corridor section designed for receiving cultivation wagons and which is movable between a cultivation wagon reception point in the plant treatment area and a rest position in one of the cultivation corridors, the corridor section of this further transfer wagon forming part of the above-mentioned one cultivation corridor.

The nature of the present invention and its aspects will be more readily understood from the following brief description of the accompanying drawings, and discussion relating thereto.

In the accompanying drawings:

FIG. 8 is a schematic top plan view of another example of a hothouse according to the invention;

FIG. 9 illustrates a third example of a hothouse according to the present invention; and FIG. 10 schematically illustrates a fourth example of the hothouse according to the invention.

Figure 1:
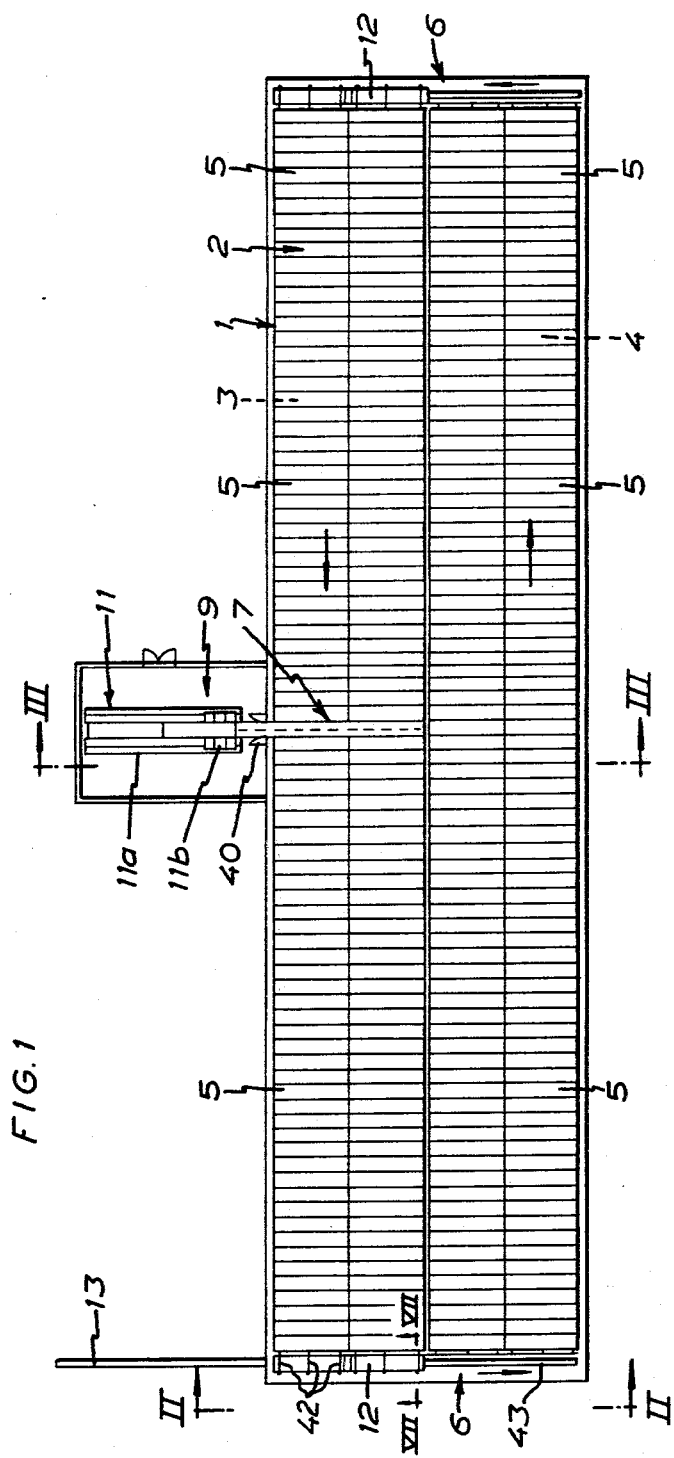
FIG. 1 is a top plan view of a hothouse according to the invention.

The hothouse 1 illustrated in FIG. 1 is based on a frame of conventional design but has, within its hothouse section 2, two parallel cultivation corridors 3 and 4. Cultivation wagons 5 are movable along these cultivation corridors, the cultivation wagons being moved in opposite directions along the two corridors, as illustrated by means of arrows in FIG. 1. A transfer apparatus 6, 7, whose nature will be described below, is provided at each end of the hothouse. The purpose of this transfer apparatus is to receive a cultivation wagon 5 from one corridor and transport it transversely to the second corridor, as illustrated by means of arrows in FIG. 1.

In the embodiment according to FIG. 1, the hothouse is provided with a plant treatment area 9 which is disposed along the longitudinal side of the house. This plant treatment area is used for harvesting and thinning and, to this end, a transfer apparatus 7 of the type described below is provided. The hothouse section 2 may be partitioned-off from the hothouse section 9 by means of doors 40.

Figure 4:
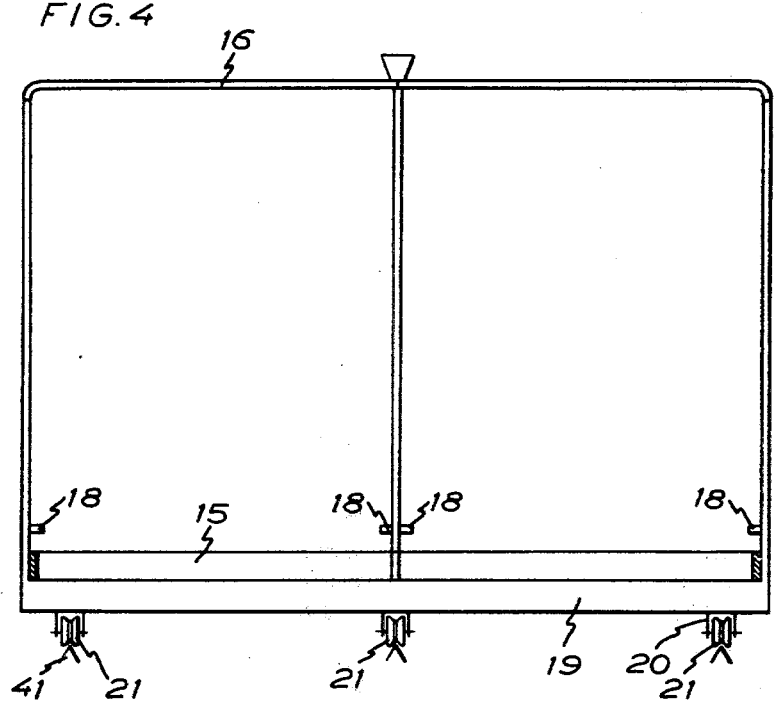
FIG. 4 is a side elevation of a cultivation wagon in a hothouse according to the invention.
Figure 5:
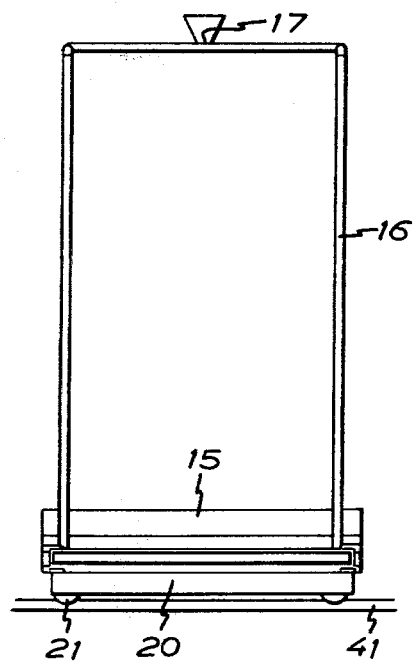
FIG. 5 is an end elevation of the same cultivation wagon.
Figure 6:
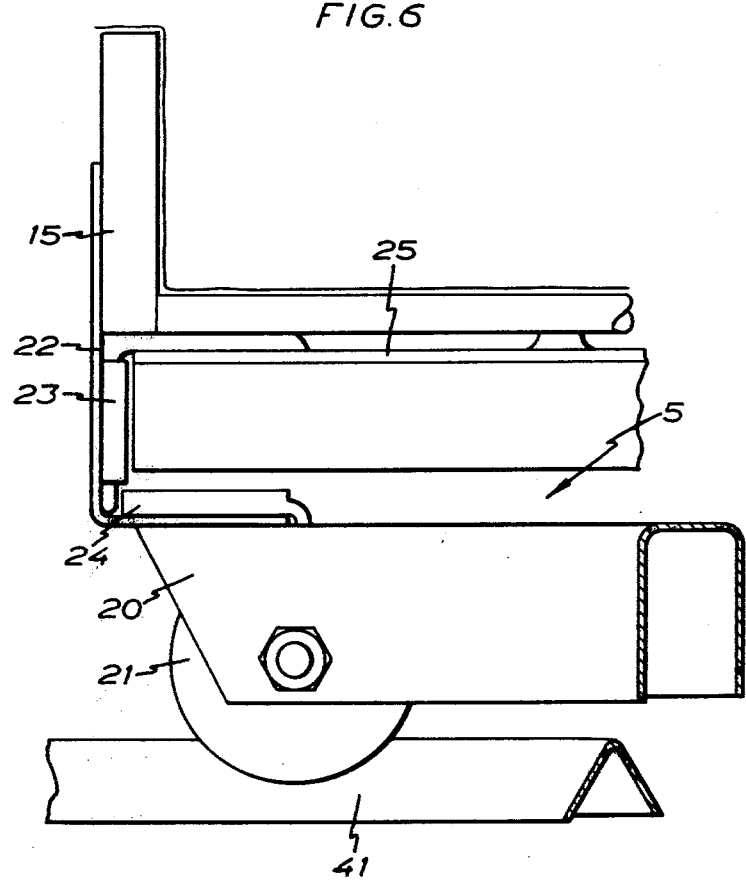
FIG. 6 shows a corner portion of the cultivation wagon.

As is apparent from FIGS. 4 and 5, the cultivation wagons have a cultivation tray 15 which is disposed at the bottom of a frame comprising a cross-beam 19, a U-beam 20, angle irons 22 and a retainer yoke 23. Wheels 21 are journaled in the U-beam 20. Moreover, the cultivation wagon is provided with a tubular framework 16 which allows for the tying-up of the plants. The framework 16 also serves for water supply in that it is provided with a water receptacle 17. Water distribution pipes 18 project from the framework and discharge above the cultivation trays 15.

The wheels of the cultivation wagons run on triangular rails 41 which form the tracks in the two cultivation corridors 3 and 4.

Figure 2:
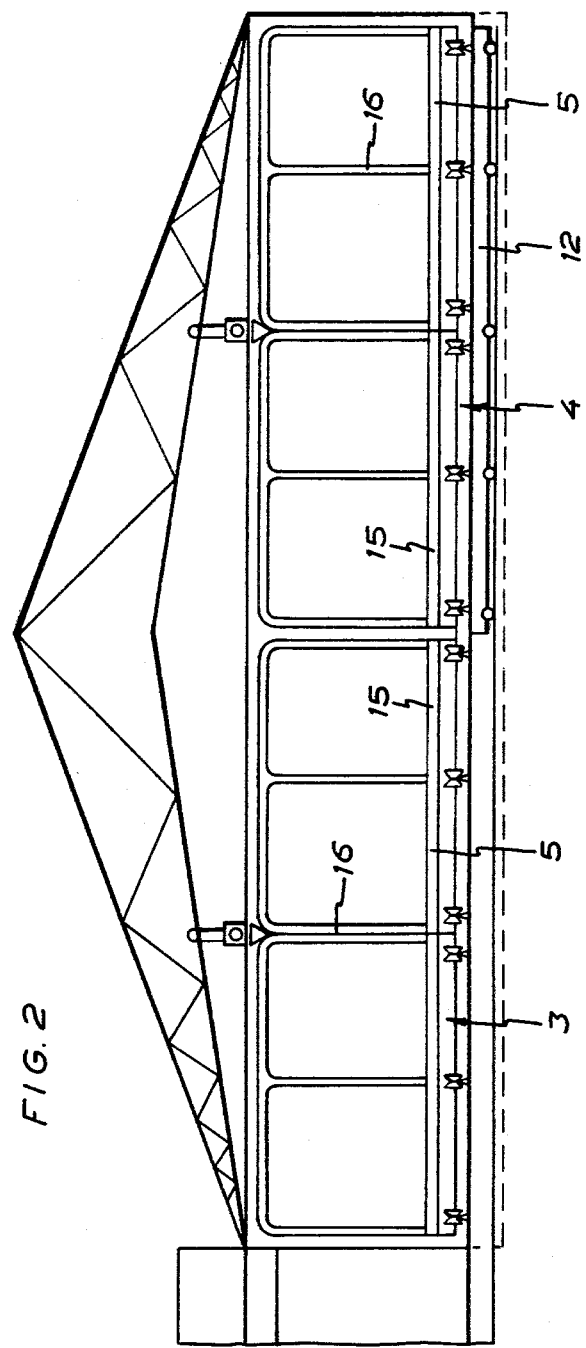
FIG. 2 is a view taken along the line II—II in FIG. 1.
Figure 7:
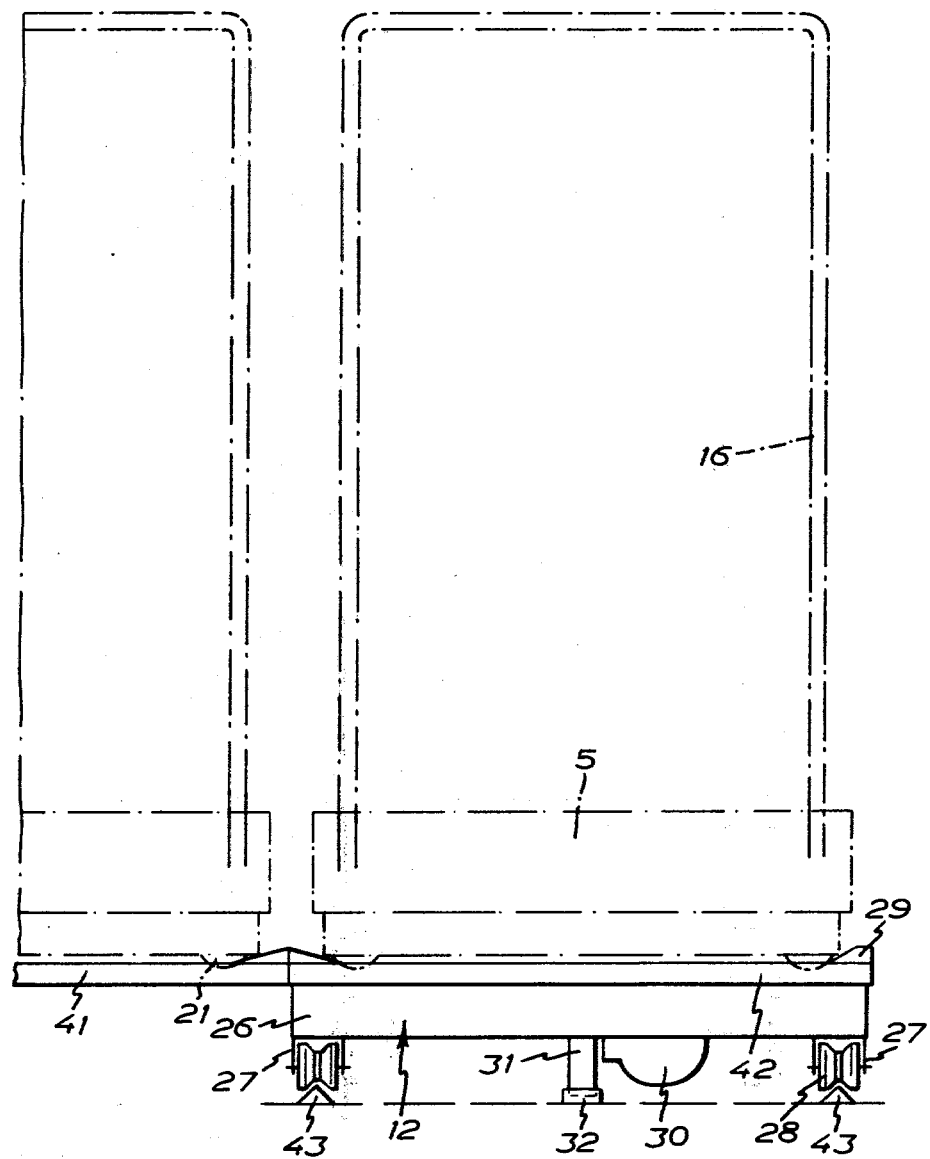
FIG. 7 is a section taken along the line VII—VII in FIG. 1 and shows a transfer wagon included in the hothouse.

As is apparent from FIGS. 1, 2 and 7, the transfer apparatus 6 is provided with a transfer wagon 12 which carries on its upper side triangular rails 42 in register with the rails 41 in the cultivation corridors. The transfer wagon has cross-beams 26, U-beams 27 and wheels 28 journaled in the U-beams. The wheels 28 run on rails 43 which extend transversely of the cultivation corridors 3 and 4. The transfer wagons 12 may be advanced by means of a motor 30 which drives a pinion 31 which, in turn, engages with a rack 32 on the floor of the house.

As is apparent from FIG. 7, ramp stops 29 are provided at the end of the rails 41 and at both ends of the rails 42. These ramp stops prevent unintentional running of the wheels 21 of the cultivation wagons over the ends of the rails 41 and 42. Thus, a positive force is required to shift the cultivation wagons 5 out onto the transfer wagons 12.

The transfer wagons 12 are shiftable between positions opposite the two cultivation corridors 3 and 4 so that the wagons may be conveyed from one corridor to the other.

Figure 3:
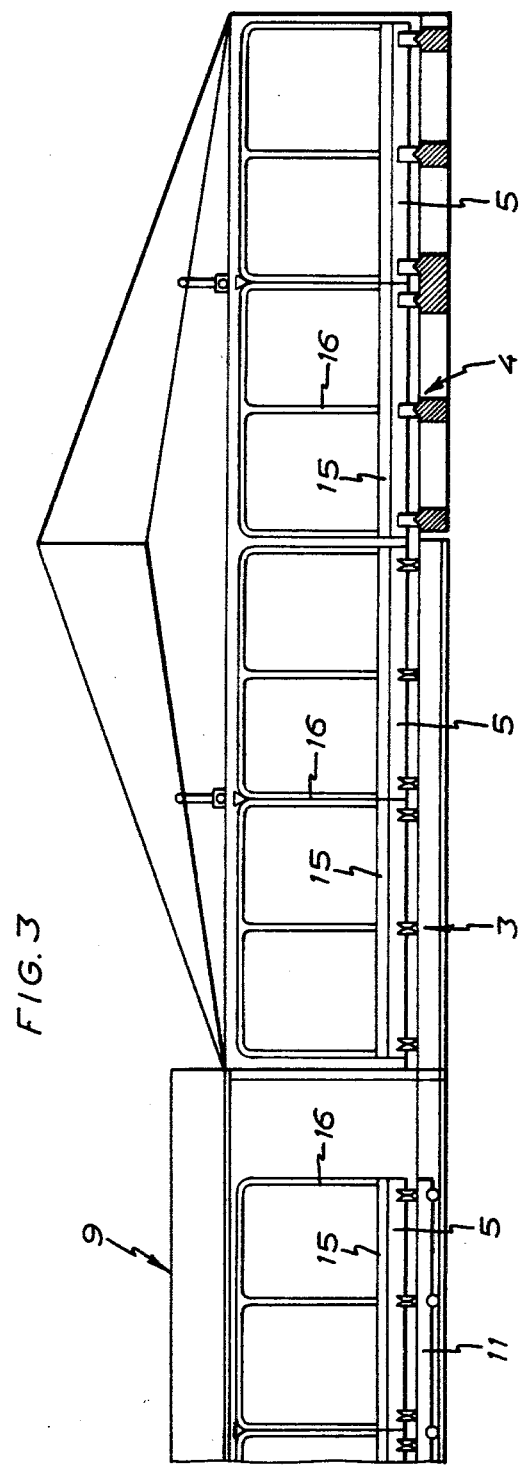
FIG. 3 is a section taken along the line III—III in FIG. 1.

As was mentioned above, a plant treatment area 9 is provided along the longitudinal side of the hothouse section 2. The transfer apparatus 7 including a transfer wagon 11 is provided for conveying the cultivation wagons out to this area. The transfer wagon 11 is constructed in the same manner as the above-described transfer wagon 12. Thus, as will be apparent from FIG. 3, the transfer wagon 11 may be shifted between a position out in the area 9 and a position within the cultivation corridor 3, the transfer wagon serving as a section of this cultivation corridor in that it mounts transverse rails.

As is apparent from FIG. 1, the transfer apparatus 6 may be provided with an extended corridor section 13 which protrudes from the hothouse proper, in order that it be possible to remove from the hothouse the transfer wagon with a cultivation wagon placed thereon, for example, for earth replacement.

FIG. 8 shows another embodiment of a hothouse according to the invention. In this instance, the two cultivation corridors 3 and 4 have been placed in separate sections 2a, 2b of a hothouse, the two sections being interconnected via the transfer apparatuses 6 which, in this case, are accommodated in two transverse areas 8 and 10 and in which area 14 forms a plant treatment area and area 10 forms a transfer area which may be partitioned-off from the sections 2a and 2b of the hothouse and contain equipment for processing the material on the cultivation wagons, for example, equipment for the vapor-disinfection of earth.

FIG. 9 shows a further embodiment in which several hothouses according to the invention have been placed in series with each other, the plant treatment area 8 being common to two hothouse lengths, like the earth processing area 10.

FIG. 10 shows a similar arrangement.

Thus, it will be apparent from the drawings and the body of the specification that the hothouse includes at least two elongate, co-extensive cultivation corridors 3 and 4, the cultivation wagons 5 being disposed in transverse relationship to the elongate cultivation corridors. The ends of the elongate cultivation corridors are, thus, interconnected by means of a transfer apparatus 6, 7 in the form of a reciprocally movable transfer wagon 12 which carries a corridor section 42 designed for receiving cultivation wagons and which is movable into alignment positions with this corridor section 42 placed opposite each cultivation corridor 2, 3, 41. Moreover, the hothouse has at least one plant treatment area 8, 9, 10 which is disposed outside the extent of the elongate cultivation corridors. In one case, the plant treatment area is placed in association with at least one of the transfer wagons at the ends of the cultivation corridors (FIGS. 8–10); in a second case, the plant treatment area is provided in association with a further transfer wagon 11 which also carries a corridor section 42 designed to receive cultivation wagons, and which is movable between a cultivation wagon reception point in the plant treatment area and a rest position in the one cultivation corridor 3, the corridor section of this further transfer wagon forming part of this cultivation corridor.

In the embodiment according to FIG. 1, the plant treatment area 9 is provided with a carrier device 11a which may be raised and lowered for receiving the transfer wagon 11 with the cultivation wagon 5 located thereon. This device 11a may also be provided with a personnel carrier unit which is movable with respect to the transfer wagon and the cultivation wagon and which may be raised and lowered and/or movable longitudinally or transversely with respect to the cultivation wagon.

The embodiment according to FIG. 10 shows another advantage inherent in the present invention, namely that the hothouse sections 2a, 2b which include the cultivation corridors 3 and 4 may be made considerably longer than the spaces 8 and 10 included in the hothouse for plant treatment and transfer, respectively.

What we claim and desire to secure by Letters Patent is:

1. A hothouse, primarily intended for the cultivation of tomatoes or lettuce, comprising
   (a) at least two corridors, the ends of one corridor being adjacent the ends of the other corridor,
   (b) a plurality of cultivation wagons in adjacent relationship in each said corridor,
   (c) transfer means at the adjacent ends of said corridors for transferring cultivation wagons from one corridor to a corridor adjacent thereto,
   (d) a plant treatment area adjacent to at least one said corridor, and
   (e) transfer means for transferring cultivation wagons between said plant treatment area and said adjacent corridor.

2. The hothouse of claim 1, said corridors having rails for guiding the wheels of said cultivation wagons, at least one said transfer means having rails alignable with said first-mentioned rails.

3. The hothouse of claim 2, said transfer means comprising a wheeled wagon.

4. The hothouse of claim 1, said corridors being in adjacent, parallel relationship.

5. The hothouse of claim 1, said plant treatment area being intermediate the ends of one said corridor.

6. The hothouse of claim 1, said hothouse having two additional corridors in spaced parallel relationship to said first two corridors, said plant treatment area being intermediate said first mentioned corridors and transfer means for transferring cultivation wagons between at least one of said first corridors and one of said additional corridors.

7. The hothouse of claim 1, said hothouse having at least two additional corridors substantially in line with said first two corridors, said plant treatment area being intermediate said first mentioned corridors and said additional corridors.

8. The hothouse of claim 1, said plant treatment area transfer means comprising a wagon and said plant treatment area having carrier means therein for receiving said last mentioned wagon.

9. The hothouse of claim 8, said plant treatment area having personnel carrier means therein, and means for raising and lowering and longitudinally or transversely moving said personnel carrier in relation to the said wagon received on said first mentioned carrier means.

10. The hothouse of claim 1, and a transfer area at one end of said corridors, said first mentioned transfer means comprising a wagon and comprising means for transferring said cultivation wagons on said last mentioned wagon to and from a said corridor and said transfer area.

11. The hothouse of claim 10, and partition means between said transfer area and said corridors.

12. The hothouse of claim 10, and means in said transfer area for processing material carried by said cultivation wagon.

13. The hothouse of claim 1, said corridors being adjacent and parallel, said hothouse having two additional corridors in spaced parallel relationship to said first two corridors, a first section of said hothouse containing said second mentioned corridors, a cultivation section between said first and second sections of said hothouse, and transfer means for transferring cultivation wagons between at least one of said first corridors and one of said second corridors.

14. The hothouse of claim 1, said hothouse comprising means for emitting heat beneath at least some of said cultivation wagons, cultivation trays carried by said cultivation wagons, and gaps between said cultivation trays for the upward passage of heat past said cultivation trays.

15. The hothouse of claim 1, at least some of said cultivation wagons comprising tubular framework extending upwardly therefrom, water distribution holes in said tubular framework, and water supply means carried by said cultivation wagon and fluid connected to said tubular framework.

16. The hothouse of claim 1, said corridors being in one section of said hothouse, said transfer means and said plant treatment area being in other sections of said hothouse, and said corridor containing section being longer than said other sections.

17. The hothouse of claim 1, said corridors being in one section of said hothouse, said transfer means and said plant treatment area being in other sections of said hothouse, and said corridor containing section being lower than said other sections.

* * * * *